May 26, 1964 B. C. DICKEY 3,134,528

TAPE TRANSPORT SYSTEM

Filed March 30, 1962 3 Sheets-Sheet 1

BARON C. DICKEY
INVENTOR.

BY Robert G. Clay

ATTORNEY

BARON C. DICKEY
INVENTOR.

BY Robert G. Clay
ATTORNEY

BARON C. DICKEY
INVENTOR.
BY Robert G. Clay
ATTORNEY 3,134,528
Patented May 26, 1964

3,134,528

TAPE TRANSPORT SYSTEM

Baron C. Dickey, Portola Valley, Calif., assignor to Ampex Corporation, Redwood City, Calif., a corporation of California Filed Mar. 30, 1962, Ser. No. 183,902
4 Claims. (Cl. 226—97)

This invention relates to magnetic tape transport systems, and particularly to tape transport mechanisms providing rapid start and stop functions for digital data processors.

Magnetic tape systems are used for the storage and processing of signals and data in a wide variety of applications because they provide a superior combination of high storage capacity and low equipment cost with moderate operating speeds. For many applications, particularly for modern digital computers and data processors such tape transport mechanisms must operate reversibly, and start and stop the tape extremely rapidly. The data must also, however, be packed closely on the tape in order to conserve tape and to reduce access time to any selected data.

The relatively large and bulky reels on which tape is wound, and the weight of the reeled tape itself, necessarily introduce high inertia into the supply and take-up reel mechanisms. These mechanisms alone therefore do not provide fast starting and stopping capabilities and it is necessary instead to achieve such characteristics through the use of additional mechanisms. The accelerating forces acting directly on the tape itself are usually provided by pinch rollers which urge the tape against high speed capstans. The use of these devices in turn requires some means of energy absorption or buffering between the capstans and reel mechanisms. Buffering or compliance mechanisms take a number of different forms in modern systems. In one form, a long length of tape loop is held within a vacuum chamber and provides an extremely low inertia coupling length which permits rapid starting and stopping without damage to the tape. Such mechanisms, however, require considerable space, sensitive control and usually utilize complicated and therefore costly servo systems.

It is also known to use a mechanical compliance mechanism consisting of a spring loaded or servo controlled arm movement that provides an adjustable loop or loops in the tape between the capstans and reels. Movements of this kind introduce more inertia than can be tolerated in systems which must achieve very fast start-stop times.

A number of particular difficulties are encountered in systems that seek to achieve extremely fast intermittent operation. The tape must be accelerated so rapidly that it often billows or loops and subsequently is snapped, or is subjected to extremely high tension transients, either of which effects can break or appreciably stretch the tape. Even though the billowing or looping may not cause tape damage, irregularities may be introduced in the movement of the tape sufficient to disturb the recording or reproducing of data. For example the initial movement of the tape around stationary guides, or even around roller guides, which have appreciable inertia and are therefore initially stationary, may cause frictional vibrations in the tape that cause "drop-out" of some of the closely-packed data at the heads. It therefore is often necessary to utilize pressure pads on each side of the magnetic head assembly in order to hold the tape in constant relationship to the magnetic heads and to damp out vibrations that cause "drop-out." These pressure pads not only abrade the tape, but can result in the generation of static electricity and cause a number of other irregularities.

It is therefore an object of the present invention to provide an improved tape transport mechanism having extremely rapid starting and stopping capabilities.

Another object of the present invention is to provide an improved tape transport mechanism which provides excellent control over a magnetic tape which is rapidly started and stopped, while simultaneously keeping the tape substantially free from excessive tensions.

Another object of the present invention is to provide a compact magnetic tape transport for digital processors, which transport provides movement of a magnetic tape in either direction past a magnetic head, while keeping the tape in uniform relationship to the head and utilizing only small and gradual changes in the tensions acting on the tape.

Magnetic tape transports in accordance with the present invention achieve these and other objects by providing very low inertia tensioning means in combination with a mechanical compliance system between the capstan means and each of the magnetic tape reels in the system. The low inertia tensioning means appear as an air spring that responds immediately to movement of the tape and that exerts a very low and substantially smoothly-changing tension on the tape in the vicinity of the capstan means and the magnetic head, holding the moving magnetic tape in precise juxtaposition to the magnetic head assembly.

In a specific example of a system in accordance with the invention, vacuum chambers or pockets are disposed on each side of a reversible driving system, between the driving capstans and separate multiple loop compliance mechanisms. The vacuum chambers are open at one end adjacent the path of the tape, so as to receive the tape and permit a loop therein. Slot orifices along each of the chambers are coupled through plenum chambers to an associated mechanism for drawing a vacuum, and differential pressure draws the tape down to traverse the slot orifice at some intermediate region. The length of the loop within each of the vacuum chambers determines the tension that is exerted on the tape on that side of the driving system. The tension is very low but varies sufficiently and linearly to tend to maintain the length of the loop in each chamber at a position of equilibrium somewhere between the ends of the slot orifices. During rapid starting and stopping of the tape, the tape acts directly against these air springs and is not subjected to high tension gradients or reflected shocks. The tape in the vicinity of the head is constantly held under light tension during all states of operation and accordingly is kept in engagement with the head assembly without the use of pressure pads. In addition, the tape wrap around guiding members is reduced to a minimum so as to eliminate frictional "drop-out" vibration.

A better understanding of the invention will be had with reference to the following description taken in consideration with the accompanying drawings, in which.

Figure 1:
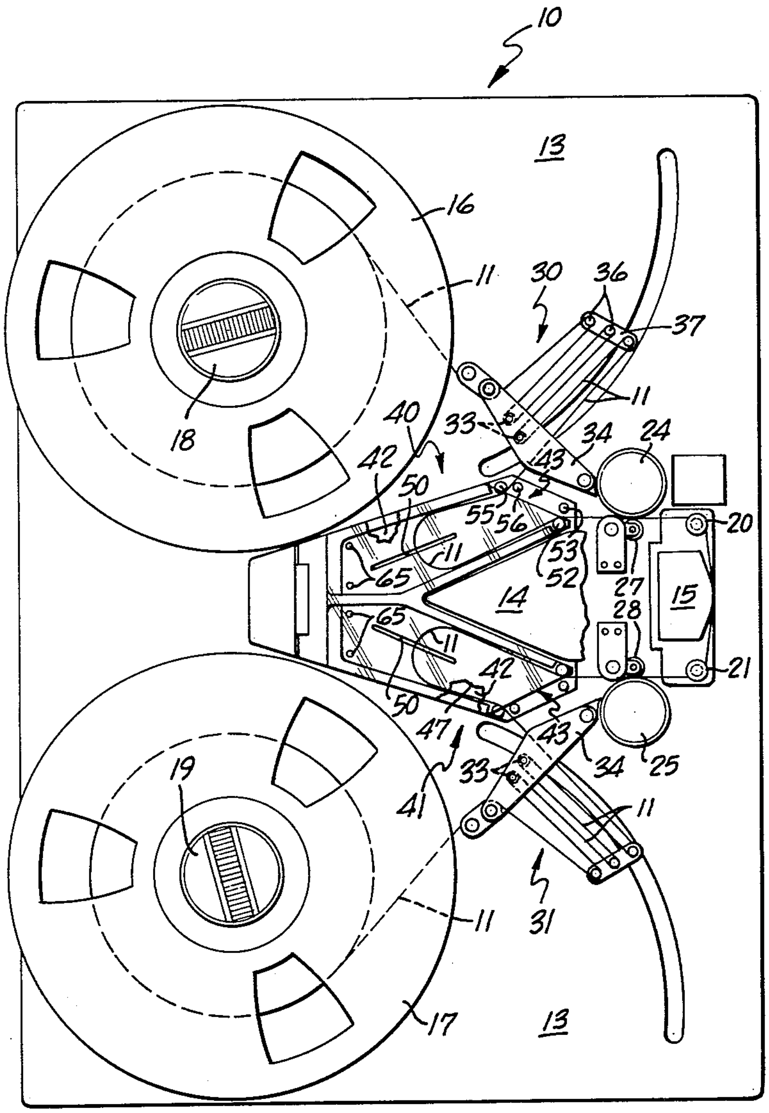
FIGURE 1 is an elevation view of the front panel of a tape transport system in accordance with the invention.
Figure 2:
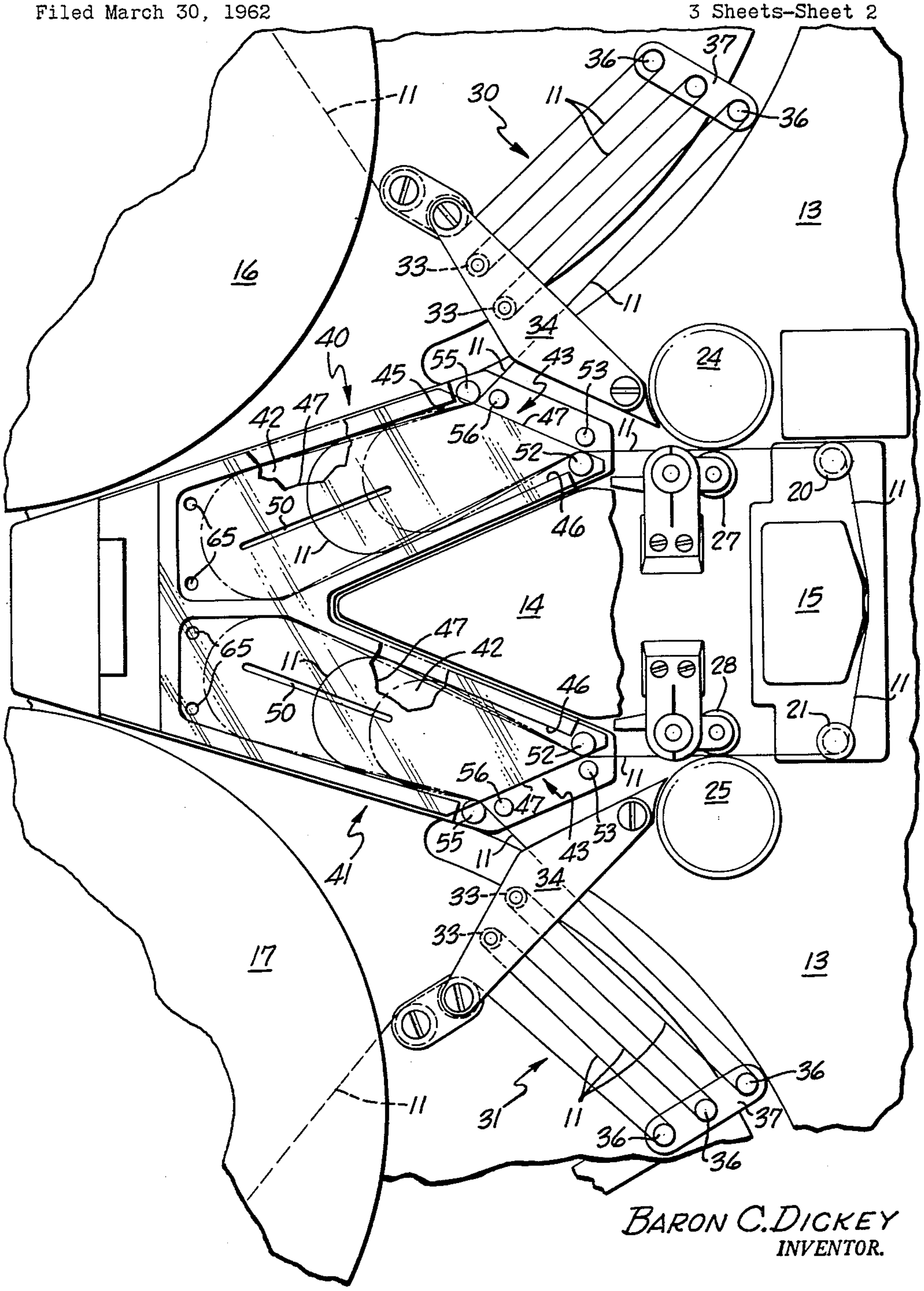
FIGURE 2 is an enlarged elevation view of a portion of the apparatus shown in FIGURE 1.
Figure 3:
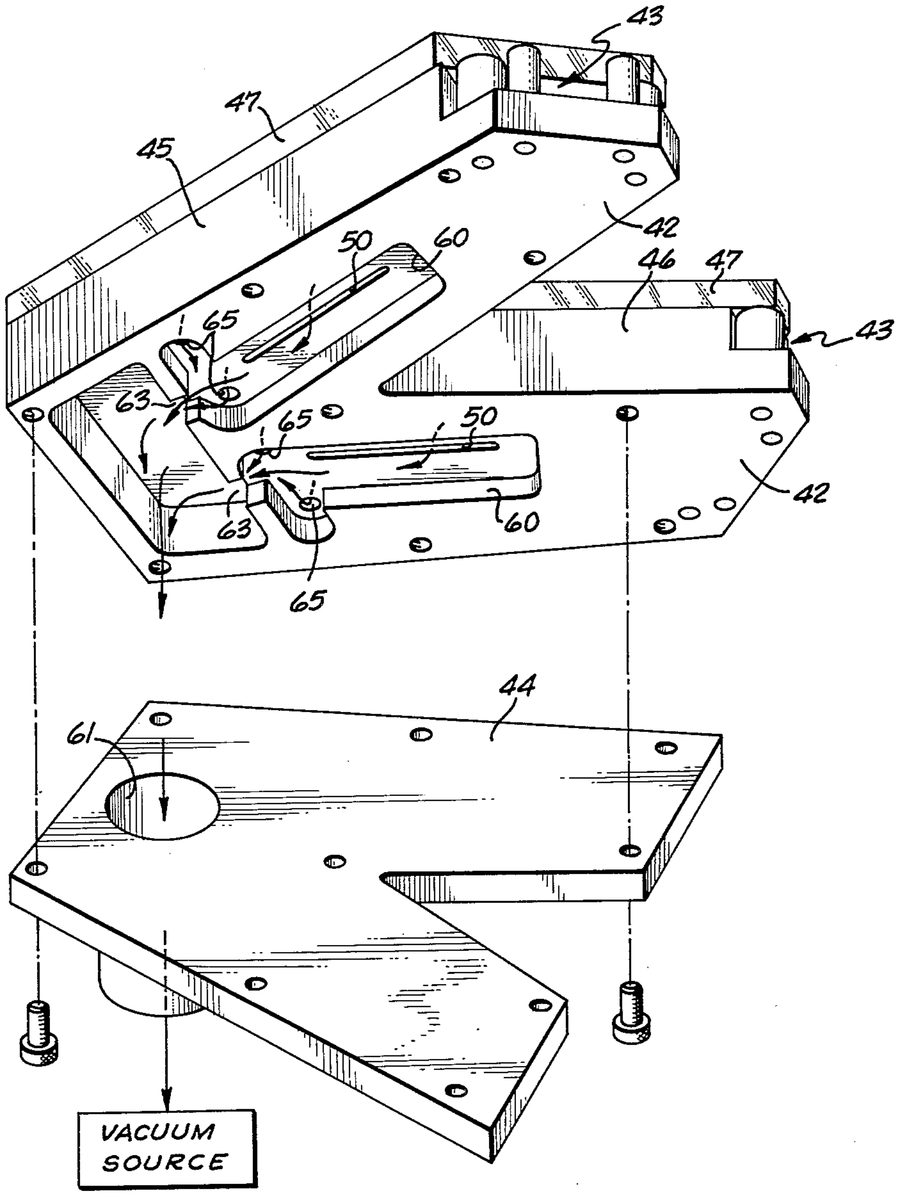
FIGURE 3 is an enlarged exploded perspective view of a fragment of the arrangement, showing various operative features.

An illustrative system employing features of the invention is shown in FIGURES 1–3. The system comprises a high-speed digital tape transport 10 having capability for starting and stopping a tape 11 extremely quickly. Details of servo circuitry and well-known mechanical arrangements have not been shown in order to simplify the description. Various driving motors and control mechanisms have also been omitted or only shown generally for the same reasons.

The principal operative units of the system 10 are mounted to protrude above a front panel 13 for the cabinetry or container in which the mechanism is positioned. The tape 11 is moved in either longitudinal direction past a cover 14 (broken away in FIGURE 1) that normally covers a recording-reproducing head assembly 15 between a pair of tape reels 16, 17 mounted on rotatable hubs 18, 19. For convenience, even though the tape 11 may be run in forward or reverse while recording or reproducing signals, the upper tape reel 16 will be referred to as the supply reel, and the lower reel 17 will be refered to as the takeup reel. Servo motors (not shown) mounted coaxially with the hubs 18, 19 and controlled by servo systems including position sensors (not shown) govern the movement of the hubs 18, 19 and the supply and winding of the tape 11 during all conditions of operation. These conditions include continuous as well as intermittent movement in either direction.

The head assembly 15 and remaining elements are advantageously positioned substantially symmetrically with respect to the reels 16, 17. For more uniform acceleration, movement and deceleration of the tape 11 in both directions at the head assembly 15, the tape 11 is directed in substantially parallel paths which are substantially normal to the tape path which crosses the head assembly 15. For this purpose the tape 11 is turned around separate guides 20, 21 which lie on opposite sides of the head assembly 15. The tape 11 may be held in selected relation to the magnetic heads by a guide mechanism (not shown) but no pressure pads are used in holding the tape 11 against the idlers 20, 21.

The parallel lengths of tape 11 on each side of the head assembly each pass between a different tape driving assembly comprising a driving capstan 24 or 25 and movable pinch roller 27 or 28. Each capstan 24 or 25 is rotated by a capstan motor (not shown) in a direction such as to draw the tape 11 away from the head assembly 15 toward the respective capstan 24 or 25. Accordingly, each capstan-pinch roller set may conveniently be said to be located downstream of the head assembly, when the particular driving assembly is actuated. The pinch rollers 27, 28 are moved separately into engagement with the directly opposed capstans 24 or 25 in accordance with signal commands from the associated data processing system. Rotary or linear actuating means (not shown) of conventional types may be used for this purpose. In practice, the tape transport systems herein disclosed operate reliably and consistently with start-stop times on the order of a millisecond and better.

The mechanical buffering or compliance mechanism that provides the principal compensation for differences in tape 11 movement by the capstans and reels consists of two adjustable multiple loop devices 30, 31. Each of the multiple loop devices 30, 31 is positioned between a different one of the reels 16 or 17 and the proximate capstan 24 or 25, respectively. Multiple loops are formed in the tape 11 at each device 30, 31 by passage of the tape in a serpentine path between spaced idlers 33 on a fixed member 34 and spaced idlers 36 on a movable member 37. The movable member 37 is, in conformity with known systems, swung along an arc in the front panel 13 as needed to smooth out the flow of tape. The position of the movable member 37 may, by a proportional or on-off system, govern the rotation of the associated reel 16 or 17.

The multiple loop devices 30, 31 are alone satisfactory as compliance mechanisms with relatively slower speed systems. The inertia that they present in the system is, however, a material factor when it is desired to achieve high tape acceleration and deceleration during starting and stopping. At these speeds, the tensions that act to move the tape appear, at least initially, in the form of sudden shocks which may be repeatedly reflected along the tape between the capstan and the mechanical compliance mechanism. It is not only desired to buffer the force of such shocks to minimize the tendency which is thereby introduced for the tape 11 to billow or loop and to be subject to sudden snapping, but also to eliminate the effect of such shocks in causing "drop-out" of data at the heads.

Accordingly, there is provided in accordance with the invention an extremely low inertia compliance mechanism which cooperates in a particularly effective fashion with the elements thus far described. One of these low inertia mechanisms 40, 41 is positioned between each of the capstans 24 or 25 and the adjacent multiple loop device 30 or 31, respectively. The mechanisms 40, 41 may be fitted symmetrically between the various elements without requiring any increase in the size of the tape transport system.

Each of the low inertia mechanisms 40, 41 includes a tape loop chamber or pocket 43, seen best in FIGURES 2 and 3. One wall (the back wall as seen in FIGURE 3) of the chamber 43 is a plate 42. The side walls 45, 46 of the chamber formed integrally with the plate 42 and are angled to come together at the end farthest from the path of the tape 11. This provides a relatively small V-shaped assembly which can usually be fitted into existing systems. The plate 42 is in turn mounted on a bottom plate 44. The front wall 47 of the chamber, which is hinged for cleaning and may be transparent for visual inspection, is coupled to the side walls 45, 46 to complete a chamber which is air-sealed except for four orifices. One orifice is a slot 50 in the back wall, two others are the openings 65 in the back wall, and the other is the open end at the part of the chamber 43 adjacent to the tape path. The open end defines a tape receiving opening for the chamber.

It is preferred, in accordance with the invention, to so dispose and configure each chamber 43 as to provide a number of significant features. The spacing between the inner surfaces of the front and back walls is only slightly greater than the width of the tape 11, so that little air can be drawn around the side edges of a loop of tape in the chamber. The line of the side wall 46 that is closest to the capstan 24 lies at a very small acute angle to the line of travel of the tape 11 between the capstan 24 and the near edge of the chamber 43. Thus the tape 11 makes only a slight bend on leaving the chamber 43. In other words, the angle of wrap of the tape around the guide at the end wall 46 is as small as possible, consistent with the object of causing the tape loop to close the opening of the chamber. Thus the friction between guide and tape is reduced, and one of the causes of dropout vibration is eliminated. The bend made by the tape at the end of wall 45 is similarly small. The side walls 45, 46 diverge slightly proceeding in the direction toward the closed end. This divergence provides a compensation for a variation encountered in the tension introduced by the slot orifice 50. The slot orifice 50 is equal in width along its length, but begins well toward the middle of the chamber 43 from the open end. The open end of chamber is set to lie substantially flush with a taut tape moving across it. Further, at the open end the tape 11 is constrained to move between an entrance guide 52 and a closely spaced retaining pin 53, and an exit guide 55 and a closely spaced retaining pin 56. In moving in the path between these elements the tape 11 does not open a substantial gap with the open end of the chamber 43, even when drawn taut.

The slot orifice 50 in each of the chambers 43 communicates with a plenum chamber 60 (FIGURE 3) formed as a cavity in the plate 42 and covered by the plate 44. The chamber 60 encompasses the slot orifice 50. A communicating passageway 61 couples the plenum chamber 60 through a flow control orifice 63 to a vacuum source or drawing means 64. The flow control orifice 63 provides a degree of isolation between two plenum chambers 60.

In operation, referring now to FIGURES 1–3 taken together, each of the chambers 43 acts as a very low inertia air spring by establishing and maintaining a controlled loop between the adjacent capstan and the adjacent multiple loop compliance mechanism. On beginning operation, the tape 11 is threaded through each of the compliance mechanisms, between the capstans and pinch rollers and around the head assembly 15 between the two reels 16, 17. In each vacuum chamber 43, the tape 11 is passed between the guide and pin sets 52, 53 and 55, 56 respectively. The vacuum drawing means 64 communicates with the interiors of the vacuum chambers 43 through the flow control orifice 63, communicating passageway 61 and plenum chamber 60 to materially reduce the pressure within the chamber 43 and thereby to cause the differential pressure existing on the two sides of the tape 11 to tend to draw the tape 11 into each of the chamber 43. The differential pressure is determined by the size of the flow control orifice 63 and the size of the portion of slot 50 that is exposed to atmospheric pressure on the side of the tape loop nearest the open end of the chamber 43. As previously stated, when the tape 11 is taut across the open end of the chamber 43, there is sufficient restriction of flow for a maximum differential pressure to exist. This differential pressure carries the tape 11 down into the vacuum chamber 43 until the path of the tape loop intercepts the slot orifice 50 well within the chamber 43. Before the tape loop extends to the closest end of the orifice 50 the differential pressure and the tension exerted on the tape remain substantially constant at maximum value. As the tape loop extends further into the chamber, however, an increasingly larger part of the length of the slot orifice 50 is free to communicate directly with the open end of the chamber 43, so that the differential pressure between the two flat sides of the tape 11 begins to decrease as the tape loop increases. The tape loop therefore automatically seeks some point of equilibrium between the opposite ends of the slot orifice 50 and in operation continually moves intermediate the ends of the slot orifice 50 in seeking to maintain the equilibrium position. Openings 65 are provided at the closed end of each chamber 43, communicating to the respective plenum chamber 60, to prevent destruction of the pressure differential when the tape moves past the end of the slot 50.

This arrangement therefore constitutes a self-contained servo system of an extremely simple kind. There are a number of reasons for the stability of the device and the advantageous operating features. The diverging aspect of the side wall 45, 46 has a negative effect with respect to the decrease in tape tension that is caused by decreasing differential pressure with increase in loop length within the chamber 43. As the loop length increases, the cross-sectional area of loop exposed to the differential pressure is increased, resulting in a relative increase of tension. The result is that the gradient of tension change is rendered less steep, though it remains linear. This negative characteristic produced by the diverging walls is introduced to compensate for a positive characteristic that is introduced by the use of a large slot orifice 50. A large slot orifice 50 is advantageous because it is easier to fabricate and remains free from clogging through the accumulation of particles during operation. The vacuum system operates as a flow limited system, and the stability of the air spring arrangement remains essentially the same despite disturbances such as line voltage variations which might affect the vacuum drawing means 64.

Further advantages are derived by the use of a relatively small acute angle between the line of travel of the tape and the line of entry into the vacuum chamber 43 (best seen in FIGURE 1). The tape 11 is not required to make a sharp bend at this point, which might increase the tension exerted. At the same time, the line along the open end of the vacuum chamber 43 provides a reasonable tape path also free from sharp bends in the event of vacuum failure.

It is preferred to employ separate plenum chambers 60 and to use the flow control orifices 63 for isolation of these chambers from each other. The low tensioning forces that are employed, while stable, might under some circumstances become unstable if an interaction is permitted to occur between the separate vacuum chambers.

The advantages provided by this arrangement can be of benefit in any tape transport mechanism where extremely low tension gradients must be observed. Thus such mechanisms may advantageously be employed in conjunction with long loop vacuum chambers that utilize considerably higher tensions and sharp re-entrant tape paths. Also, when the machine is to be operated to repeatedly play a short length of tape, containing say only a single block of information the vacuum chambers provide all the storage that is needed, and the reels do not have to be operated.

While there have been described above and illustrated in the drawings various forms of tape transport mechanisms in accordance with the invention that permit a magnetic tape to be started and stopped very rapidly without the introduction of tension transients or high tension gradients, it will be appreciated that the invention is not limited thereto. Accordingly, the invention should be considered to include all modifications, variations and alternative forms falling within the scope of the appended claims.

What is claimed is:

1. A tape transport system having high start and stop speeds, comprising a pair of tape storage reels each having a first stop-start inertia, a dual capstan system disposed along the path of tape travel between said reels and including oppositely rotating capstans, and pinch roller means for providing reversible tape drive, a pair of second tape storage and tensioning means each having a second start-stop inertia which is less than said first stop-start inertia, each of said second means being positioned along the path of tape travel adjacent one of said reels, and a pair of third differential pressure tape storage and tensioning means each having a third stop-start inertia which is less than said second inertia and each being disposed along the path of the tape travel between said second tape storage and tensioning means and one of said capstans, each of said third means having walls defining an elongated vacuum chamber with an open end positioned adjacent the path of tape travel and with an elongated narrow opening in one wall thereof, means defining a second chamber which encompasses said opening and vacuum drawing means connected to each of said second chamber defining means for drawing a vacuum in the vacuum chamber through said opening, the opening extending lentghwise of said vacuum chamber generally perpendicularly to a loop of tape formed in the vacuum chamber by differential pressure, the width and length of the opening being such that the tape is tensioned in conformity with a tension gradient that is substantially rectilinear throughout the normal operating range of movement of the tape in said vacuum chamber.

2. A tape transport system having high start and stop speeds, comprising a pair of tape storage reels each having a first stop-start inertia, a dual capstan system disposed along the path of tape travel between said reels and including oppositely rotating capstans, and pinch roller means for providing reversible tape drive, a pair of second tape storage and tensioning means each having a second start-stop inertia which is less than said first stop-start inertia, each of said second means being positioned along the path of tape travel adjacent one of said reels, a pair of third differential pressure tape storage and tensioning means each having a third stop-start inertia which is less than said second inertia and each being disposed along the path of the tape travel between said second tape storage and tensioning means and one of said capstans, each of said third means including an elongated vacuum chamber having an open end thereof positioned adjacent the path of tape travel and having an elongated slot orifice extending lengthwise thereof and generally perpendicularly to a loop of tape formed in said chamber by differential pressure to thereby establish a tension gradient for the tape that is substantially rectilinear throughout the normal operating range of the tape in the vacuum chamber, means defining a second chamber encompassing each of said slot orifices, vacuum drawing means connected to each of said second chamber defining means for drawing a vacuum in the vacuum chamber through said slot orifice, a pair of tape guide means disposed at the open end of each vacuum chamber, one side of one of said vacuum chambers, one of said guide means, and one of said second means being positioned so that there is a small acute angle between the line of tape entry into or tape exit from said one side of said one vacuum chamber, and the other side of said one vacuum chamber, the other of said guide means, and one of said capstans being positioned so that there is a small acute angle between the line of tape entry into or tape exit from said other side of said one vacuum chamber.

3. A tape transport system having high start and stop speeds, comprising a pair of tape storage reels each having a first stop-start inertia, a dual capstan system disposed along the path of tape travel between said reels and including oppositely rotating capstans, and pinch roller means for providing reversible tape drive, a pair of second tape storage and tensioning means each having a second start-stop inertia which is less than said first stop-start inertia, each of said second means being positioned along the path of tape travel adjacent one of said reels, and a pair of third differential pressure tape storage and tensioning means each having a third stop-start inertia which is less than said second inertia and each being disposed along the path of the tape travel between said second tape storage and tensioning means and one of said capstans, each of said third means including an elongated vacuum chamber having an open end thereof positioned adjacent the path of tape travel, said chamber having an elongated slot orifice extending lengthwise thereof and generally perpendicularly to a loop of tape formed in the chamber by differential pressure to thereby establish a tension gradient for the tape that is substantially rectilinear throughout the normal operating range of the tape in the vacuum chamber, said vacuum chamber diverging in width in the direction toward the closed end thereof so that the area of the tape loop exposed to differential pressure is increased as the length of the tape loop increases, whereby the gradient of tension change is rendered less steep, means defining a chamber encompassing each of said slot orifices, and vacuum drawing means connected to each of said chamber defining means for drawing a vacuum in the vacuum chamber through said slot orifice.

4. A tape transport system having high start and stop speeds, comprising a pair of tape storage reels each having a first stop-start inertia, a dual capstan system disposed along the path of tape travel between said reels and including oppositely rotating capstans, and pinch roller means for providing reversible tape drive, a pair of second tape storage and tensioning means each having a second start-stop inertia which is less than said first stop-start inertia, each of said second means being positioned along the path of tape travel adjacent one of said reels, said second means including multiple loop arm mechanisms, and a pair of third differential pressure tape storage and tensioning means each having a third stop-start inertia which is less than said second inertia and each being disposed along the path of the tape travel between said second tape storage and tensioning means and one of said capstans, each of said third means including an elongated vacuum chamber having an open end thereof positioned adjacent the path of tape travel and having an elongated slot orifice extending lengthwise thereof and generally perpendicularly to a loop of tape formed in the chamber by differential pressure to thereby establish a tension gradient for the tape that is substantially rectilinear throughout the normal operating range of the tape in the vacuum chamber, said vacuum chamber diverging in width in the direction toward the closed end thereof so that the area of the tape loop exposed to differential pressure is increased as the length of the tape loop increases, whereby the gradient of tension change is rendered less steep, means defining a chamber along each of said slot orifices, vacuum drawing means connected to each of said chamber defining means for drawing a vacuum in the vacuum chamber through said slot orifice, and a pair of tape guide means disposed at the open end of each vacuum chamber, one side of one of said vacuum chambers, one of said guide means and one of said second means being positioned so that there is a small acute angle between the line of tape entry into or tape exit from said one side of said one vacuum chamber, and the other side of said one vacuum chamber, the other of said guide means, and one of said capstans being positioned so that there is a small acute angle between the line of tape entry into or tape exit from said other side of said one vacuum chamber.

References Cited in the file of this patent

UNITED STATES PATENTS

| | | |
|---|---|---|
| 2,792,217 | Weidenhammer et al. | May 14, 1957 |
| 2,875,874 | Foret et al. | Mar. 3, 1959 |
| 2,970,732 | Lawrance et al. | Feb. 7, 1961 |
| 3,016,207 | Comstock | Jan. 9, 1962 |
| 3,062,464 | Moose et al. | Nov. 6, 1962 |
| 3,091,408 | Schoeneman | May 28, 1963 |

FOREIGN PATENTS

| | | |
|---|---|---|
| 230,942 | Australia | May 21, 1959 |